INVENTORS
DAVID W. DANIEL
ZENON KOKORZYCKI
BY *Whittemore*
*Hulbert & Belknap* ATTORNEYS July 16, 1963 D. W. DANIEL ETAL 3,097,567
MECHANISM FOR ADJUSTING HELIX ANGLE ON GEAR SHAPER CUTTERS
Filed Dec. 7, 1959 2 Sheets-Sheet 2

INVENTORS
DAVID W. DANIEL
ZENON KOKORZYCKI
BY Whittemore
Hulbert & Belknap ATTORNEYS 3,097,567
Patented July 16, 1963

1

3,097,567
MECHANISM FOR ADJUSTING HELIX ANGLE ON GEAR SHAPER CUTTERS
David W. Daniel and Zenon Kokorzycki, Detroit, Mich., assignors to National Broach & Machine Company, Detroit, Mich., a corporation of Michigan
Filed Dec. 7, 1959, Ser. No. 857,605
22 Claims. (Cl. 90—7)

The present invention relates to gear shaping machines and refers more specifically to a gear shaping machine of the Fellows type including means for shaping helical gears.

In the past gear shaping machines have been known wherein axial reciprocation of a gear cutter and rotation of the cutter about its axis has been accomplished in timed relation to rotation of a workpiece to shape gears having straight teeth. However, as will be understood by those in the machine art it is often desirable to shape gears having inclined or helical teeth. It is therefore desirable to impart to the gear cutter an oscillatory axial rotational movement in addition to the above mentioned axial rotational movement. Thus it is necessary to drive the shaft of the gear shaping machine carrying the gear cutter in a helical path while vertically reciprocating said shaft and rotating it in timed relation with a gear being shaped thereby.

Therefore it is one of the essential objects of the present invention to provide a gear shaping machine including means for shaping helical gears.

More specifically it is an object to provide a gear shaping machine comprising means for imparting axial reciprocating movement to a shaft carrying a gear cutter, means for causing said shaft to rotate about its axis in timed relation to a workpiece, and means for imparting a reciprocating axial rotational movement to said shaft.

Still more specifically it is a purpose to provide a gear shaping machine comprising a gear cutter mounted on the end of a shaft which shaft is held in a square quill, a rack and pinion for axially reciprocating said quill, a worm and worm gear for rotating said shaft about the longitudinal axis thereof, and means connected to said quill operable upon axial reciprocation of said quill to impart oscillatory rotational movement about the longitudinal axis to said shaft.

It is a further object to provide a gear shaping machine as set forth above wherein said means for providing oscillatory rotational movement about the longitudinal axis to said shaft comprises a second shaft connected to said quill having guide means thereon operable in conjunction with an inclined sine bar to produce movement of a rack secured to the sine bar transverse of said shafts and gearing operable between said rack and the first mentioned shaft operable to cause oscillatory rotation thereof on reciprocal movement of said quill.

It is a further object to provide a gear shaping machine for shaping helical gears which is simple in construction, economical to manufacture and efficient in use.

Other objects and features of the invention will become apparent as the description proceeds, especially when taken in conjunction with the accompanying drawings, illustrating a preferred embodiment of the invention, wherein.

With reference to the figures a particular embodiment of the gear shaping machine of the invention will now be described.

Figure 1:
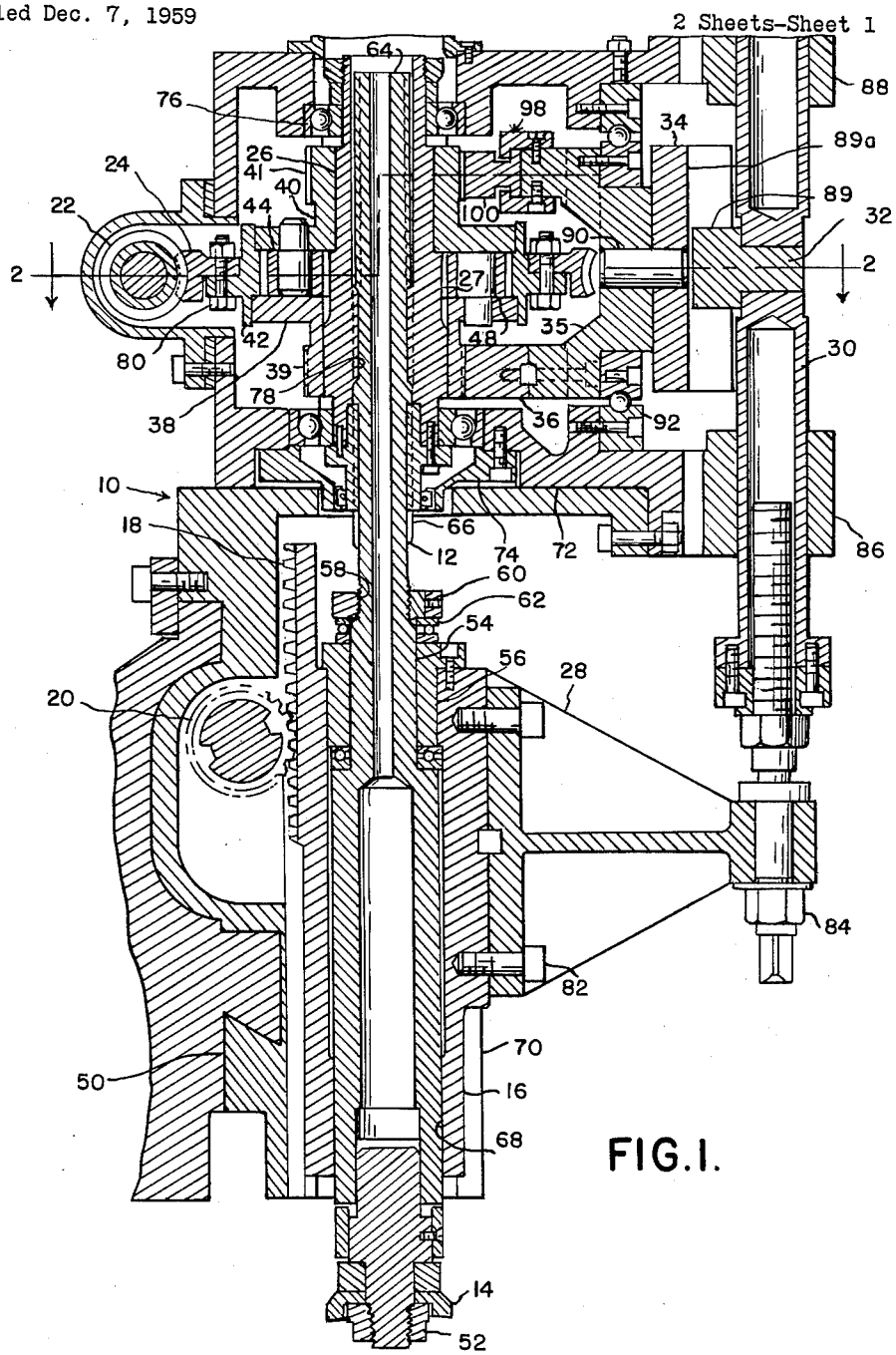
FIGURE 1 is a longitudinal section view of a gear shaping machine according to the invention.

A gear shaping machine 10 according to the invention, is illustrated in FIGURE 1. The gear shaping machine 10 includes the shaft 12 having a gear cutter 14 secured to one end thereof. The shaft 12 as shown in FIGURE 1 is held for vertical reciprocation in quill 16 which may be reciprocated by means of rack 18 and pinion 20. Rotation of shaft 12 about its longitudinal axis is produced by means of worm 22 and worm gear 24 in conjunction with splined sleeve 26. According to the invention oscillatory rotation of the shaft 12 about its longitudinal axis is accomplished by means of bracket 28 bolted to quill 16, shaft 30 secured to bracket 28 and therefore moveable with quill 16, follower 32 operable in conjunction with inclined sine bar 34, slide 35, rack 36, spiders 38 and 40 having gear portions 39 and 41 respectively, ring gear 42 and planetary pinions 44 and 48 as will subsequently be explained in more detail.

It will be understood that the oscillatory axial rotation of shaft 12 will be superimposed on the usual axial rotational and axial reciprocation movements of shaft 12. Furthermore it will be understood that the worm 22 and pinion 20 will be driven in timed relation to a workpiece in the usual manner of a Fellows gear shaping machine. Also it will be noted that the mechanism for imparting the desired axial reciprocal and rotational movement to the shaft 12 is supported on the usual ways indicated 50 for horizontal movement to and from a workpiece in the usual manner.

More specifically shaft 12 as shown best in FIGURE 1 is provided with a gear cutter 14 secured to the lower end thereof in the usual manner by means of nut 52. Shaft 12 is further provided with a reduced central portion 54 adapted to be received within bearing sleeve 56 supported by quill 16. Shaft 12 is also provided with a threaded section 58 having a collar 60 threadedly engaged therewith to hold a thrust bearing 62 between collar 60 and sleeve 56 whereby shaft 12 is supported for axial reciprocation with quill 16 and is permitted to rotate about its longitudinal axis.

The end 64 of shaft 12 is rotationally connected to sleeve 26 by means of radially extending axial splines 66. Thus axial rotation will be imparted to shaft 12 on rotation of sleeve 26.

Figure 3:
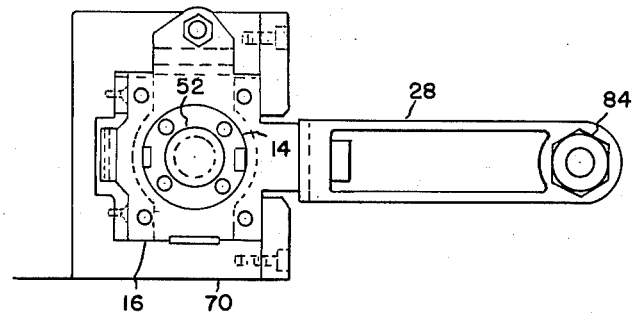
FIGURE 3 is a view of the lower end of the gear shaping machine as illustrated in FIGURE 1.

Quill 16 as best shown in FIGURES 1 and 3 is an elongated rectangular member having an axially extending cylindrical opening 68 therethrough adapted to receive shaft 12 as shown in FIGURE 1. Quill 16 as illustrated includes a rack 18 which may be driven by pinion 20 in synchronism with worm 22 and a workpiece (not shown) as previously discussed. Quill 16 may thus be vertically reciprocated in ways 70 provided therefor and attached to the frame of the gear shaping machine through ways 50.

Sleeve 26 having sun gear portion 27 is supported for rotation in frame 72 by means of the bearing and oil seal structure 74 and the bearing 76 shown best in FIGURE 1. As mentioned in connection with shaft 12 the sleeve 26 is provided with internal splines 78 which in conjunction with splines 66 on shaft 12 connect shaft 12 and sleeve 26 against relative rotational movement while permitting relative axial movement therebetween. The sun gear portion 27 of sleeve 26 is in mesh with planetary pinions 44 and 48 as shown.

In the usual construction of a Fellows gear shaping machine the sleeve 26 is rotated by means of the worm 22 and a worm gear 24 keyed directly to sleeve 26. However according to the invention since it is required to impart rotational oscillation to shaft 12 in addition to the usual rotation thereof the shaft 12 is caused to rotate about a longitudinal axis through worm 22, worm gear 24, a ring gear 42 secured to worm gear 24 by convenient means such as bolt 80 and planetary gears 44 and 48, two of which are held by each spider 38 and 40 and which are spaced one hundred eighty degrees apart on the spiders in engagement with the sun gear portion 27 of sleeve 26 at ninety degree intervals. The operation of such sun gear planetary gears and ring gear is well known and will not therefore be considered in detail. The purpose for the use of such gears in imparting rotational movement to shaft 12 from worm 22 will subsequently become apparent.

The means for imparting oscillatory rotational movement to shaft 12 according to the invention will now be described. Bracket 28 as best shown in FIGURES 1 and 3 is attached to quill 16 as by bolts 82 whereby shaft 30 secured to bracket 28 as indicated at 84 will be caused to reciprocate axially in bearings 86 and 88 on axial reciprocation of quill 16 by means of rack 18 and pinion 20.

Figure 2:
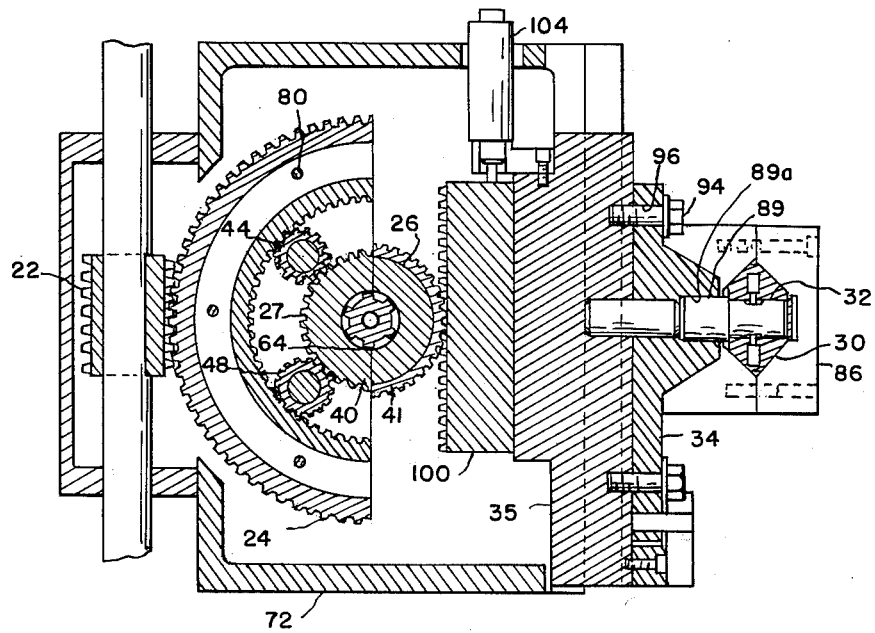
FIGURE 2 is a variable elevation cross-section of the gear shaping machine of FIGURE 1 taken on line 2—2 of FIGURE 1.

A follower 32 as shown best in FIGURES 1 and 2 is provided on shaft 30 for reciprocation therewith. Follower 32 has elongated head 89 received in rectilinear slot 89a of an angularly adjustable sine bar 34 connected by means of pin 90 to slide 35 which is mounted on frame 72 by means of guideways 92. Rack 36 as shown is fixedly attached to slide 35. Thus on axial reciprocation of shaft 30 to sine bar 34 and the attached rack 36 are caused to move transversely of the shaft 30 as shown in FIGURE 1. The angle of inclination of sine bar 34 may be adjusted by means of bolts 94 shown in FIGURE 2 in conjunction with arcuate slots 96 in the sine bar 34 as will be understood.

The entire system including ring gear 42, planetary pinions 44 and 48 and the sun gear portion 27 of sleeve 26 is made substantially free from backlash by means of the rectilinear guideway 98 between the slide 35 and rack 100 in conjunction with a hydraulic cylinder 104 shown in FIGURE 2 as will be understood by those familiar with the art.

The rack 36 engages the gear portion 39 of spider 38 which is mounted for rotation on sleeve 26 as shown in FIGURE 1. The planet gears 48 are mounted for rotation on the spider 38 so that as the rack 36 is oscillated transversely of the shafts 30 and 12 due to reciprocation of shaft 30 the spider 38 is given an oscillatory rotary motion which through the action of the ring gear 42 and planet gears 48 is imparted to the sun gear portion 27 of sleeve 26 and through the spline connection between the sleeve 26 and shaft 12 to shaft 12.

Thus should the worm gear 22 not be driven while the quill 16 is reciprocated then axial reciprocal movement will be imparted to shaft 12 and in addition thereto an oscillatory rotational movement about the longitudinal axis thereof will be imparted to shaft 12 through bracket 28, shaft 30, follower 32, sine bar 34, slide 35, rack 36, spider 38, planet gears 48 and the sun gear portion 27 of sleeve 26. Should the worm gear 22 be driven to impart axial rotation to shaft 12 as previously discussed the oscillatory rotary movement imparted to shaft 12 by the previously enumerated means will be superimposed on the rotary movement produced by rotation of worm 22 through worm gear 24 and ring gear 42 as previously explained.

The over-all operation of the gear shaping machine of the invention is then as follows:

In the over-all operation of the gear shaping machine 10 the angle of inclination of the sine bar 34 is first adjusted according to the helix or angle of inclination it is desired to impart to a workpiece to be shaped into a gear by means of adjusting bolts 94 and arcuate slots 96. Pinion 20 and worm 22 are then driven in timing with the drive means for the workpiece (not shown) in the usual manner whereupon quill 16 is caused to reciprocate axially engaging and disengaging cutter 14 with the workpiece and cutter 14 is caused to rotate in timed relation with the workpiece by means of worm gear 24, ring gear 42, planet gears 44 and 48 and the sun gear portion 27 of sleeve 26 in the manner previously described. Further according to the invention as set forth above the reciprocation of quill 16 by means of rack 18 and pinion 20 imparts an axial reciprocal movement to shaft 30 connected thereto by bracket 28 to cause the slide 35 and rack 36 to be reciprocated transversely of shaft 30 by means of follower 32 and sine bar 34. Thus through spiders 38 in conjunction with planet gears 48 and ring gear 42 a rotary oscillatory movement is imparted to the sun gear portion 27 of sleeve 26 and shaft 12. The same rotary oscillatory movement is therefore imparted to gear cutter 14 which is superimposed on the axial reciprocation and rotary movement of the gear cutter 14 caused by rotation of pinion 20 and worm 22 to thus shape a helical gear from a workpiece.

The drawings and the foregoing specification constitute a description of the improved mechanism for adjusting helix angle on gear shaper machines in such full, clear, concise and exact terms as to enable any person skilled in the art to practice the invention, the scope of which is indicated by the appended claims.

What we claim as our invention is:

1. In a gear shaping machine including a shaft having a gear cutting tool mounted thereon, pilot means for guiding the shaft during axial reciprocal and axial rotational movement thereof and drive means operable to impart axial reciprocal and unidirectional axial rotational movement to the shaft and attached gear cutting tool in synchronism with the movement of a gear to be shaped by the gear shaping machine; means associated with the shaft and drive means operable to impart an oscillatory rotational movement to said shaft which is superimposed on the axial rotational and axial reciprocal movement thereof to shaper cut helical gears, said means comprising a second shaft in transverse spaced relation to the first mentioned shaft connected directly to said first mentioned shaft for reciprocation in synchronism with the axial reciprocation of the first-mentioned shaft and means connected between the shafts for converting the axial reciprocation of said second shaft into oscillatory rotational movement of the first-mentioned shaft.

2. The structure as claimed in claim 1 wherein the first-mentioned shaft is supported for axial reciprocation in an axial reciprocal quill and said second shaft is connected to the first mentioned shaft through the quill.

3. The structure as claimed in claim 1 wherein the last-mentioned means includes a follower connected to said second shaft, an inclined sine bar having a slot therein receiving said follower, a rack slidable transversely with respect to said shafts and connected to said sine bar whereby oscillatory transverse movement of said rack is produced on reciprocation of said second shaft, and means connected between said rack and the first mentioned shaft for converting said transverse movement of said rack into oscillatory rotary movement of the first-mentioned shaft.

4. The structure as claimed in claim 3 wherein said means for converting said transverse movement of said rack into oscillatory rotary movement of the first-mentioned shaft includes a rotatable sleeve surrounding and splined to the first-mentioned shaft and having a sun gear portion, a spider rotatably mounted on said sleeve in mesh with said rack, a ring gear concentric with said sleeve, and a planetary gear mounted on said spider and in mesh with said ring gear and said sun gear portion of said sleeve whereby axial rotary motion is imparted to the first-mentioned shaft on rotation of said ring gear and superimposed reciprocal axial rotary motion is imparted to the first-mentioned shaft on transverse movement of said rack.

5. The structure as claimed in claim 3 wherein the inclination of said inclined sine bar is adjustable to determine the pitch angle of the helical teeth shaped by said gear shaping machine.

6. The structure as claimed in claim 3 wherein anti-backlash means is provided in conjunction with said rack comprising an adjustable rack member and a pressure operated piston positioned in contact with said adjustable rack member.

7. A gear shaping machine comprising a frame, a sleeve rotatably mounted in said frame, a shaft one end of which is splined within said sleeve for rotary movement with said sleeve and axial reciprocal movement relative to said sleeve, exterior teeth on said sleeve, a ring gear concentric with said sleeve, a planetary gear in mesh with said ring gear and said exterior teeth on said sleeve and a worm gear concentric with and secured to said ring gear rotatable to impart rotation to said sleeve and shaft, a vertically reciprocal quill in which the other end of said shaft is journaled for rotation, rack and pinion means operable to vertically reciprocate said quill and shaft, a second shaft supported by said frame parallel with and in spaced relation to the first-mentioned shaft, said second shaft being secured to said quill for axial reciprocation therewith, a sine bar follower mounted on said second shaft, a transversely slidable rack mounted in said frame adjacent said second shaft, a sine bar connected to said rack having an adjustable inclined slot therein in operative relation to said follower, whereby said rack is oscillated transversely with respect to said shafts on axial reciprocation of said quill, anti-backlash mechanism associated with said rack, a spider rotatably mounted on said sleeve having teeth in mesh with said rack, said spider supporting said planetary gear whereby oscillatory axial rotational movement is imparted to said first-mentioned shaft on axial reciprocation of said second shaft which is superimposed on said axial rotational and axial reciprocal movement of said first shaft.

8. Mechanism for imparting oscillatory rotary motion to an axially reciprocating and unidirectionally axially rotating shaft comprising a second shaft independent of any means for imparting the axially reciprocal and unidirectional axial rotating motion to the first mentioned shaft adapted to be axially reciprocated in synchronism with the axial reciprocation of the first-mentioned shaft and means extending transversely between said shafts for converting the axial reciprocation of said second shaft into said oscillatory rotational movement of said first shaft.

9. Mechanism as claimed in claim 8 wherein the said shafts are parallel and said last-mentioned means includes a follower attached to said second shaft, a rack slidable transversely with respect to said shaft, an inclined sine bar connected to said rack having a slot therein operatively associated with said follower whereby oscillatory transverse movement of said rack is produced on reciprocation of said second shaft, and means for converting said oscillatory transverse movement of said rack into oscillatory rotary movement of said first-mentioned shaft.

10. The structure as claimed in claim 9 wherein said means for converting said transverse movement of said rack into oscillatory rotary movement of said first-mentioned shaft includes a rotatable sleeve having a sun gear portion which sleeve surrounds and is splined to said first-mentioned shaft, a spider rotatably mounted on said sleeve in mesh with said rack, a ring gear concentric with said sleeve, and a planetary gear mounted on said spider and in mesh with said ring gear and said sun gear portion of said sleeve whereby axial rotary motion is imparted to said first-mentioned shaft on rotation of said ring gear and superimposed reciprocal axial rotary motion is imparted to said first-mentioned shaft on transverse movement of said rack.

11. Structure as claimed in claim 10 wherein said rack is provided with anti-backlash means and the inclination of said inclined sine bar is adjustable to determine the amplitude of the oscillatory rotary movement imparted to said first-mentioned shaft.

12. In a Fellows type gear shaping machine mechanism for imparting oscillatory rotary motion to the axially unidirectionally rotating and reciprocating tool carrying shaft comprising a second shaft independent of the means for imparting the axially unidirectional rotational and reciprocal movement to the tool carrying shaft adapted to be axially reciprocated in synchronism with the axial reciprocation of the first-mentioned shaft and means connecting said shafts for converting the axial reciprocation of said second shaft into oscillatory rotational movement of said first shaft.

13. Mechanism as claimed in claim 12 wherein the said shafts are parallel and said last-mentioned means includes a follower attached to said second shaft, a rack slidable transversely with respect to said shaft, an inclined sine bar connected to said rack having a slot therein operatively associated with said follower whereby oscillatory transverse movement of said rack is produced on reciprocation of said second shaft, and means for converting said oscillatory transverse movement of said rack into oscillatory rotary movement of said first-mentioned shaft.

14. The structure as claimed in claim 13 wherein said means for converting said transverse movement of said rack into oscillatory rotary movement of said first-mentioned shaft includes a rotatable sleeve having a sun gear portion which sleeve surrounds and is splined to said first-mentioned shaft, a spider rotatably mounted on said sleeve in mesh with said rack, a ring gear concentric with said sleeve, and a planetary gear mounted on said spider and in mesh with said ring gear and said sun gear portion of said sleeve whereby axial rotary motion is imparted to said first-mentioned shaft on rotation of said ring gear and superimposed reciprocal axial rotary motion is imparted to said first-mentioned shaft on transverse movement of said rack.

15. Structure as claimed in claim 14 wherein said rack is provided with anti-backlash means and the inclination of said inclined sine bar is adjustable to determine the amplitude of the oscillatory rotary movement imparted to said first-mentioned shaft.

16. A gear shaping machine comprising a frame, a sleeve rotatably mounted in said frame, a shaft one end of which is splined within said sleeve for rotary movement with said sleeve and axial reciprocal movement relative to said sleeve, exterior teeth on said sleeve, a ring gear concentric with said sleeve, a planetary gear in mesh with said ring gear and said exterior teeth on said sleeve and a worm gear concentric with and secured to said ring gear rotatable to impart rotation to said sleeve and shaft, a vertically reciprocal quill in which the other end of said shaft is journaled for rotation, rack and pinion means operable to vertically reciprocate said quill and shaft, a second shaft supported by said frame parallel with and in spaced relation to the first-mentioned shaft, said second shaft being secured to said quill for axial reciprocation therewith, a sine bar follower mounted on said second shaft, a transversely slidable rack mounted in said frame adjacent said second shaft, a sine bar connected to said rack having an adjustable inclined slot therein in operative relation to said follower, whereby said rack is oscillated transversely with respect to said shafts on axial reciprocation of said quill, a spider rotatably mounted on said sleeve having teeth in mesh with said rack, said spider supporting said planetary gear whereby oscillatory axial rotational movement is imparted to said first-mentioned shaft on axial reciprocation of said second shaft which is superimposed on said axial rotational and axial reciprocal movement of said first shaft.

17. A gear shaping machine comprising a frame, a first shaft supported by said frame for rotary and axial reciprocal movement, means for imparting unidirectional rotary and axial reciprocal movement to the first shaft, a second shaft supported by the frame parallel with and in transverse spaced relation to the first shaft, said second shaft being secured to said first shaft for axial reciprocation therewith, and means between the shafts independent of the means for imparting unidirectional rotary and axial reciprocal movement to the first shaft for imparting a reciprocal rotary movement to the first shaft on axial reciprocation of the second shaft.

18. A gear shaping machine comprising a frame, a first shaft supported by said frame for rotary and axial reciprocal movement, means for imparting unidirectional rotary and axial reciprocal movement to the first shaft, a second shaft supported by the frame parallel with and in transverse spaced relation to the first shaft, said second shaft being secured to said first shaft for axial reciprocation therewith, a rack positioned between the shafts, means connected between the second shaft and rack for producing reciprocal transverse movement of the rack relative to the first shaft on axial reciprocation of the first shaft, and means connected between the rack and first shaft for imparting a reciprocal rotary movement to the first shaft on reciprocal transverse movement of the rack relative to the first shaft.

19. Structure as set forth in claim 18 wherein the means for producing reciprocal transverse movement of the rack relative to the first shaft on axial reciprocation of the first shaft comprises a sine bar and follower acting therebetween.

20. Structure as set forth in claim 18 wherein the means for producing reciprocal rotary movement of the first shaft on reciprocal transverse movement of the rack comprises a rotatable sleeve having a sun gear portion which sleeve surrounds and is splined to said first-mentioned shaft, a spider rotatably mounted on said sleeve in mesh with said rack, a ring gear concentric with said sleeve, and a planetary gear mounted on said spider and in mesh with said ring gear and said sun gear portion of said sleeve.

21. A gear shaping machine comprising a frame, a first shaft supported by said frame for rotary and axial reciprocal movement, means for imparting unidirectional rotary and axial reciprocal movement to the first shaft, a second shaft supported by the frame parallel with and in transverse spaced relation to the first shaft, means for axially reciprocating said second shaft with said first shaft, and means between the shafts independent of the means for imparting unidirectional rotary and axial reciprocal movement to the first shaft for imparting a reciprocal rotary movement to the first shaft on axial reciprocation of the second shaft.

22. A gear shaping machine comprising a frame, a first shaft supported by said frame for rotary and axial reciprocal movement, means for imparting unidirectional rotary and axial reciprocal movement to the first shaft, a second shaft supported in transverse spaced relation to the first shaft, means for axially reciprocating said second shaft with the first shaft, and means between the shafts independent of the means for imparting unidirectional rotary and axial reciprocal movement to the first shaft for imparting a reciprocal rotary movement to the first shaft on axial reciprocation of the second shaft.

References Cited in the file of this patent

UNITED STATES PATENTS

| | | |
|---|---|---|
| 1,103,851 | Sykes | July 14, 1914 |
| 2,126,907 | Miller | Aug. 16, 1938 |
| 2,170,608 | Kitchen | Aug. 22, 1939 |
| 2,330,921 | Rickenmann | Oct. 5, 1943 |
| 2,375,052 | Umbdenstock | May 1, 1945 |
| 2,660,931 | De Vlieg | Dec. 1, 1953 |